United States Patent
Judd et al.

(10) Patent No.: US 9,262,882 B2
(45) Date of Patent: Feb. 16, 2016

(54) SOCIAL VOTING-BASED CAMPAIGNS IN SEARCH

(71) Applicant: Google Inc., Mountain View, CA (US)

(72) Inventors: Tilke Mary Judd, Zurich (CH); Jyrki A. Alakuijala, Zurich (CH); Alexandru Ovidiu Dovlecel, Zurich (CH); Zaheed Sabur, Adiliswil (CH); Abraham Moolenaar, Adliswil (CH); Peter W. Dickman, Birmensdorf (CH); Marvin Chow, San Francisco, CA (US); Ardan Arac, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/143,287

(22) Filed: Dec. 30, 2013

(65) Prior Publication Data

US 2015/0120401 A1    Apr. 30, 2015

Related U.S. Application Data

(60) Provisional application No. 61/897,758, filed on Oct. 30, 2013.

(51) Int. Cl.
| | | |
|---|---|---|
| G06F 17/30 | (2006.01) | |
| G07C 13/00 | (2006.01) | |
| G06Q 50/00 | (2012.01) | |
| G06Q 30/02 | (2012.01) | |

(52) U.S. Cl.
CPC .......... *G07C 13/00* (2013.01); *G06F 17/30699* (2013.01); *G06Q 30/02* (2013.01); *G06Q 30/0256* (2013.01); *G06Q 50/01* (2013.01); *G06Q 30/0224* (2013.01)

(58) Field of Classification Search
None
See application file for complete search history.

(56) References Cited

U.S. PATENT DOCUMENTS

| | | | |
|---|---|---|---|
| 7,840,563 B2 * | 11/2010 | Powers et al. | 707/736 |
| 8,037,506 B2 | 10/2011 | Cooper et al. | |
| 8,055,669 B1 | 11/2011 | Singhal et al. | |
| 8,167,725 B1 | 5/2012 | Patnaik et al. | |
| 8,200,663 B2 | 6/2012 | Jones et al. | |
| 8,224,696 B2 | 7/2012 | Speiser et al. | |
| 8,695,033 B2 * | 4/2014 | Fasting | 725/34 |
| 8,700,615 B2 | 4/2014 | Jones et al. | |
| 8,775,418 B2 | 7/2014 | Poon | |
| 2008/0083003 A1 | 4/2008 | Biniak et al. | |
| 2008/0270389 A1 | 10/2008 | Jones et al. | |

(Continued)

OTHER PUBLICATIONS

Pepsi Refresh on Facebook (Article [online], Jan. 25, 2011 [retrieved on Jun. 12, 2014]. Retrieved from the Internet: < URL:https://web.archive.org/web/20110125131535/http://appsplosive.com/2010/12/pepsi-refresh-on-facebook/>.*

(Continued)

*Primary Examiner* — John Hayes
*Assistant Examiner* — Jason Fenstermacher
(74) *Attorney, Agent, or Firm* — Fish & Richardson P.C.

(57) ABSTRACT

Methods, systems, and apparatus, including computer programs encoded on a computer storage medium, determining that a voting user interface (VUI) is to be provided with search results, the VUI enabling a user to submit one or more votes in a voting-based campaign; receiving social content, the social content having been distributed using one or more social networking services; receiving search results that are responsive to a search query; and transmitting instructions to display the search results and the VUI, the VUI comprising the social content.

10 Claims, 7 Drawing Sheets

(56) References Cited

U.S. PATENT DOCUMENTS

| | | |
|---|---|---|
| 2011/0016005 A1 | 1/2011 | Li et al. |
| 2012/0102062 A1* | 4/2012 | Gurnani et al. ............... 707/769 |
| 2012/0144412 A1 | 6/2012 | Sharma et al. |
| 2013/0174055 A1 | 7/2013 | Johnson et al. |
| 2014/0025666 A1* | 1/2014 | Marlow et al. ............... 707/723 |

OTHER PUBLICATIONS

Pepsi Refresh Project (Article [online], May 29, 2012 [retrieved on Jun. 12, 2014]. Retrieved from the Internet: < URL: https://web.archive.org/web/20120529031644/http://hbs.hugeinc.com/casestudies/pepsi>.*

Pepsi Refresh on Facebook (Article [online], Jan. 25, 2011 [retrieved on Jun. 12, 2014]. Retrieved from the Internet: < URL: https://web.archive.org/web/20110125131535/http://appsplosive.com/2010/12/pepsi-refresh-on-facebook/>).*

Authorized Officer Satu Tschubel, International Search Report and Written Opinion for International Application No. PCT/US2014/062675, dated Feb. 6, 2015, 15 pages.

\* cited by examiner

FIG. 2D

SOCIAL VOTING-BASED CAMPAIGNS IN SEARCH

CROSS-REFERENCE TO RELATED APPLICATIONS

This application claims the benefit of and priority to U.S. Prov. Ser. No. 61/897,758 filed on Oct. 30, 2013, the disclosure of which is expressly incorporated herein by reference in the entirety.

SUMMARY

This specification relates to supporting voting-based campaigns in search.

Implementations of the present disclosure are generally directed to selectively providing a voting user interface (VUI) with search results. In some implementations, the VUI is associated with a voting-based campaign, and a user can interact with the VUI to participate in the voting-based campaign.

In general, innovative aspects of the subject matter described in this specification can be embodied in methods that include actions of determining that a voting user interface (VUI) is to be provided with search results, the VUI enabling a user to submit one or more votes in a voting-based campaign; receiving social content, the social content having been distributed using one or more social networking services; receiving search results that are responsive to a search query; and transmitting instructions to display the search results and the VUI, the VUI including the social content.

Other implementations of this aspect include corresponding systems, apparatus, and computer programs, configured to perform the actions of the methods, encoded on computer storage devices.

These and other implementations can each optionally include one or more of the following features. For example, the social content is displayed in the VUI in response to user input to the VUI, the user input indicating a vote of the user. The social content includes content associated with one or more contacts of the user within the one or more social networking services. The social content is associated with an entity, the entity being associated with the voting-based campaign. The entity includes a participant in the voting-based campaign. The entity includes a user that submitted the search query and that uses the VUI to participate in the voting-based campaign. The social content is associated with a plurality of entities, each entity associated with the voting-based campaign, wherein the user can vote for one or more of the entities using the VUI. Receiving user input indicating a vote for an entity contestant that is participating in the voting-based campaign. At least partially in response to receiving the user input, prompting the user to participate in a group. The group includes a group of a social networking service, the group being usable to distribute content within the social networking service. The VUI includes a gaming interface, the gaming interface enabling the user to guess an outcome of voting in the voting-based campaign. Updating the search results based on the user input indicating the vote. Updating the social content based on the user input indicating the vote. The search results include one or move video-based results.

Particular implementations of the subject matter described in this specification can be implemented so as to realize one or more of the following advantages. Implementations of the present disclosure provide a channel, through which users can participate in voting-based campaigns. In this manner, more users are able to participate in voting-based campaigns, providing a more accurate reflection of user preferences. Further, by enabling users to participate through search or a search engine results page (SERP), users can be more informed in the votes they make based on information surfaced in search results.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2D depict an example search results page including an example voting user interface (VUI).

DETAILED DESCRIPTION

Figure 1:
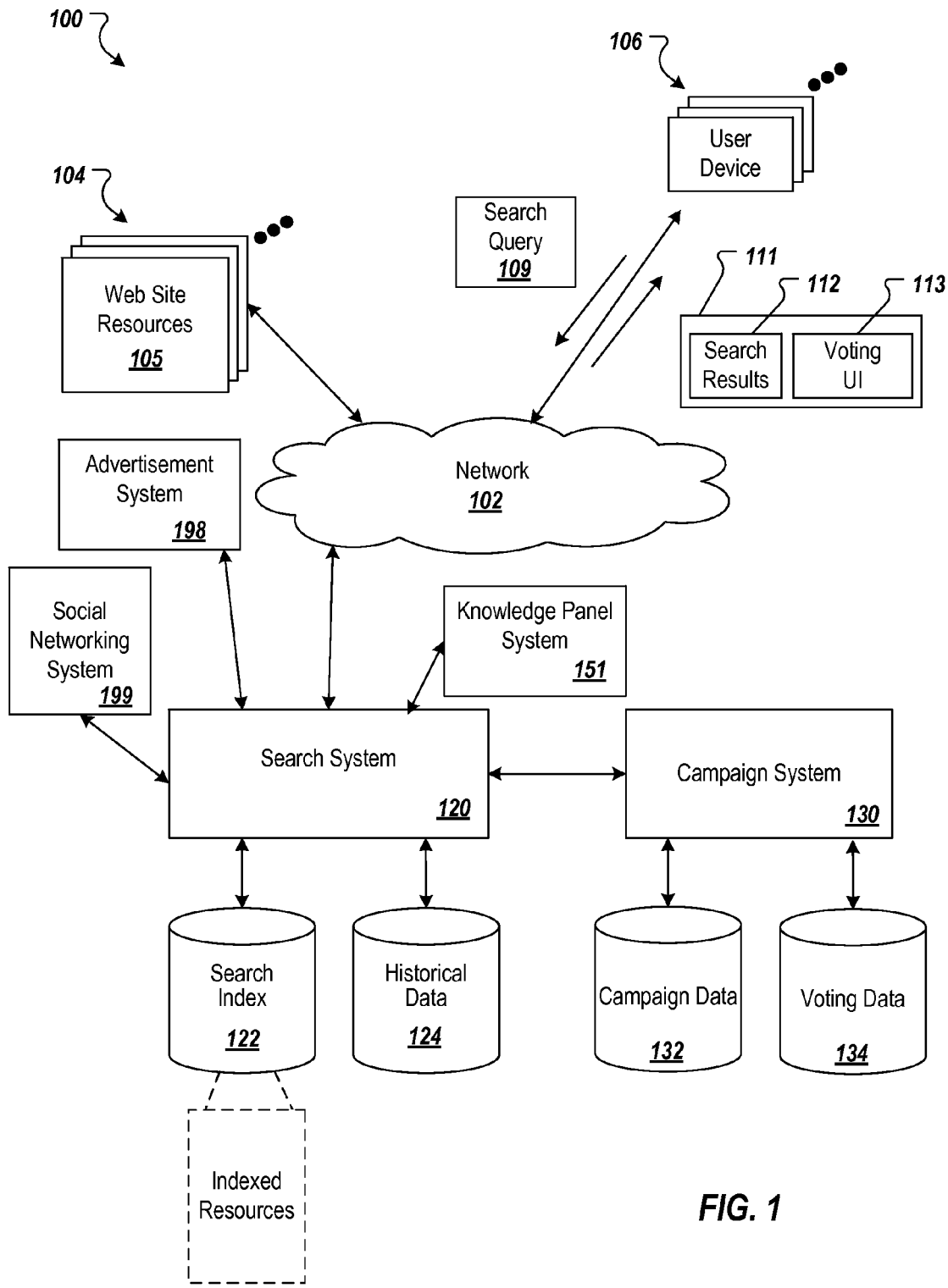
FIG. 1 depicts an example environment in which users can interact with one or more computer-implemented services.

FIG. 1 depicts an example environment 100 in which users can interact with one or more computer-implemented services. Example computer-implemented services can include a search service, an electronic mail service, a chat service, a document sharing service, a calendar sharing service, a photo sharing service, a video sharing service, a blogging service, a micro-blogging service, a social networking service, a location (location-aware) service, a check-in service, and a ratings and review service. In the example of FIG. 1, a search service is depicted, which is discussed in further detail herein. It is appreciated, however, that implementations of the present disclosure can include one or more computer-implemented services, such as the examples described herein.

With continued reference to FIG. 1, a search system 120 provides search services. The example environment 100 includes a network 102, e.g., a local area network (LAN), a wide area network (WAN), the Internet, or a combination thereof, that connects web sites 104, user devices 106, and the search system 120. In some examples, the network 102 can be accessed over a wired and/or a wireless communications link. For example, mobile computing devices, such as smartphones, can utilize a cellular network to access the network. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is capable of requesting and receiving resources 105 over the network 102. Example user devices 106 include personal computers, mobile computing devices, e.g., smartphones and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 typically includes a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer. The selection data can also include, for each selection of a search result 112, data identifying the search query 109 for which the search result 112 was provided.

In accordance with implementations of the present disclosure, the example environment 100 also includes a campaign system 130 communicably coupled to the search system 120, e.g., directly coupled or coupled over a network such as network 102. In some examples, and in the case of multiple computer-implemented services, the campaign system 130 is communicably coupled to respective systems that provide functionality of the respective computer-implemented services. In some examples, the systems, e.g., the search system 120, can interact with the campaign system 130 to provide voting support for voting-based campaigns. In some examples, voting-based campaigns can include campaigns having results that are at least partially based on voting. Example campaigns can include polls, elections, contests, marketing and the like. In some examples, the campaign system 130 provides voting functionality, which can be supported in the one or more computer-implemented services. In some examples, the campaign system 130 can access and/or provide campaign data and/or voting data that can be stored in a data store 134. In some examples, campaign data can include content and/or rules associated with a campaign. In some examples, voting data can include votes cast during a campaign.

In some examples, the search system 120 can interact with the campaign system 120 to provide voting functionality. In some examples, the voting functionality is provided in response to a search query 109. In some examples, the voting functionality is provided through a voting user interface (VUI) 113 that is provided in the search results display 111. In some examples, and as discussed in further detail herein, the VUI 113 can be displayed in-line with search results, e.g., at the top of the search results page, in the middle of the search results page, at the bottom of the search results page, or the VUI 113 can be displayed adjacent to the search results, e.g., on the right-hand-side or the left-hand-side of the search results page. In some implementations, the search system 120 can interact with the campaign system 130 and an advertisement system 198 to provide voting functionality with advertisements. In some implementations, the search system 120 can interact with the campaign system 130 and a social networking system 199 to provide voting functionality with social networking functionality (e.g., within a social networking stream of posts, video-based search results).

In some examples, knowledge panels can be displayed in search results. For example, the example environment 100 can also include a knowledge panel system 151 communicably coupled to the search system 120, e.g., directly coupled or coupled over a network such as network 102. The search system 120 can interact with the knowledge panel system 151 to determine whether to provide a knowledge panel within the search results display 111. If it is determined that a knowledge panel should be provided, the knowledge panel system 151 can generate the knowledge panel and provide the generated knowledge panel to the search system 120. In some examples, and as discussed in further detail herein, the knowledge panel can be displayed in-line with search results, e.g., at the top of the search results page, in the middle of the search results page, at the bottom of the search results page, or the knowledge panel can be displayed adjacent to the search results, e.g., on the right-hand-side or the left-hand-side of the search results page.

In some examples, a knowledge panel can be provided for queries that have been determined to reference a particular entity, such as a person, place, country, landmark, animal, historical event, organization, business, sports team, sporting event, movie, song, album, game, work of art, or any other entity. For example, one or more topics can be determined from the submitted search query, and it can be determined that the one or more topics correspond to an entity, for which a knowledge panel is available. In response, the knowledge panel can be triggered for display. In some examples, whether to display a knowledge panel can be determined based on a set of rules.

In general, a knowledge panel for a particular entity can include content related to the particular entity. In some implementations, a knowledge panel includes a set of factual information deemed relevant to the particular entity. For example, a knowledge panel for an actor may include biographical information for the actor, as well as content associated with movies or television shows that the actor has appeared. In some implementations, the knowledge panel includes a summary of information related to the particular entity. For example, a knowledge panel for a nation may include a map of the nation, the flag of the nation, the official language of the nation, and/or other facts and content related to the nation. In some examples, information provided in the knowledge panel can be pulled from one or more resources, e.g., the resources 105, and can be merged to populate the knowledge panel.

Implementations of the present disclosure are generally directed to supporting voting in search. In some implementations, and as discussed in detail herein, voting functionality is provided with search results. In some examples, the voting functionality enables users to participate in campaigns. Example campaigns can include polls, elections, contests, marketing and the like. For example, users can interact with the voting functionality to participate in a poll, e.g., whether the user is satisfied or dissatisfied with a status quo. As another example, users can interact with the voting functionality to participate in an election, e.g., to cast a vote for a candidate for an office. As another example, users can interact with the voting functionality to participate in a contest, e.g., to vote for a contestant in a talent contest. As another example, users can interact with the voting functionality to participate in a marketing campaign, e.g., make a product selection from a plurality of products.

Implementations of the present disclosure are discussed in further detail herein with reference to an example context. The example context includes providing voting functionality to enable voting for candidates in a talent contest. A fictitious talent contest can include "Top American Singer" (TAS), which includes a televised, national (United States) singing competition between fictitious competitors. TAS includes fictitious judges: Jenny Prosinger, Producer Pedro, and T. Scout. The fictitious competitors include: Suzie Singer, Veronica Vocals, Loud Ralph and Jimmy Sing-a-lot.

Although implementations of the present disclosure are discussed in further detail herein with reference to the example contexts, it is appreciated that implementations of the present disclosure can be provided in any appropriate context.

Implementations, of the present disclosure provide a voting platform in search. In accordance with implementations of the present disclosure, a VUI can be displayed with search results in response to a search query submitted by a user. In some examples, it can be determined whether to trigger display of the VUI based on an explicit intent or an implicit intent of the user. In some examples, the explicit intent and/or implicit intent of the user can indicate an intent of the user to search for a campaign that utilizes the VUI. In some implementations, display of the VUI can be triggered based on whether a knowledge panel is to be displayed in search results. In some examples, if a knowledge panel associated with the campaign is to be displayed in search results, the VUI is also displayed in search results. In some implementations, display of the VUI can be triggered based on one or more attributes associated with the user and/or the query, and one or more rules associated with the campaign.

In some implementations, display of the VUI can be triggered based on one or more terms of the query being matched to one or more entities of a knowledge graph. In some examples, a knowledge graph is a data structure that is based on a schema and that represents entities and relationships between entities. In some examples, the knowledge graph includes nodes, each node representing an entity, and edges between nodes, each edge representing a relationship between entities. In some examples, it can be determined that one or more terms of the query matches an entity of the knowledge graph, and that the entity is associated with a campaign, for which a VUI is available. Consequently, the VUI can be displayed.

In some implementations, the query can be processed to provide a revised query. In some examples, the query can be processed to correct spelling and/or to include synonyms. In some examples, one or more other queries that can be associated with the query can be appended to the query to provide the revised queries. For example, the query can be included in a cluster of queries, the cluster of queries including the one or more other queries. In some examples, the revised query can be provided based on a progression of queries submitted by the user. For example, the user can submit a series of queries, each query providing further specificity, drilling down in an effort to surface search results that the user may deem more relevant. A revised query can include a combination of two or more queries in the series of queries.

In some implementations, the explicit intent and/or the implicit intent are determined based on the search query. In some examples, one or more terms of the search query can indicate an explicit intent to search for resources associated with a campaign. For example, the user can submit the example search query [top american singer], which indicates an explicit intent to search for resources associated with TAS. In some examples, one or more terms of the search query can indicate an implicit intent to search for resources associated with the campaign. For example, the user can submit the example search query [veronica vocals loud ralph], which can indicate an implicit intent to search for resources associated with TAS. In some examples, if it is determined that the query includes an explicit intent or an implicit intent to search for resources associated with a campaign, a VUI associated with the campaign can be displayed.

In some implementations, implicit intent of the user can be determined based on content associated with the user in the one or more computer-implemented services. For example, and as introduced above, a user can use one or more computer-implemented services, and content associated with the user can be provided through use of the one or more computer-implemented services. In some examples, one or more user-specific indices can be provided, which index content associated with the user from the one or more computer-implemented services. That is, a user-specific index can be provided as a user-specific search index to search for content associated with the user in a respective computer-implemented service.

As an example, and with respect to a computer-implemented social networking service, the user can post content, e.g., distribute content, through the social networking service, and/or can endorse and/or share content that other users have posted through the social networking service. As another example, and with respect to a computer-implemented search service, the user can submit queries to the search service, where each query can be considered content associated with the user. As another example, and with respect to a computer-implemented video sharing service, the user can search for and view videos posted through the video sharing service, and can comment on, endorse and/or share videos. In some examples, each of these actions can be considered content associated with the user.

In some examples, content associated with the user in the one or more computer-implemented services can indicate implicit intent of the user. For example, the user can submit a search query that is tangentially associated with an entity associated with a campaign, e.g., the search query is directed to a contestant that is participating in the campaign. The search query can be cross-referenced with content that is associated with the user in the one or more computer-implemented services. For example, the search query can be provided as input to a user-specific index. In some examples, it can be determined that the user content indicates that the user has an interest in the campaign. For example, the content indicates that the user often watches videos of the campaign through the computer-implemented video sharing service, and often posts about the campaign in the computer-implemented social networking service. Consequently, it can be determined that there is an implicit intent of the user for search results related to the campaign.

In some implementations, triggering of the VUI can be filtered based on one or more attributes associated with the user and/or the query. More particularly, attributes associated with the user and/or the query can be processed in view of one or more rules associated with the campaign. Example attributes associated with the user can include demographic attributes such as age and location. In some examples, attributes associated with the user can be provided in a user profile established by the user in the one or more computer-implemented services. Example attributes associated with a query can include a location, from which the query was submitted, and a time, at which the query was submitted. In some examples, the time, at which a query was submitted, can be provided in a request received from a device, through which the user submitted the query. In some examples, the location, from which the query was submitted, can be determined based on an Internet protocol (IP) address of the device, through which the user submitted the query.

In some examples, display of the VUI can be triggered based on the one or more attributes in view of the one or more rules associated with the campaign. For example, an entity underlying the campaign, e.g., a production company producing the campaign, can provide one or more rules associated with voting in the campaign. Example rules can include voter demographics, voter location, a time-based voting window, and verified user accounts. For example, rules can be provided that require voters to have a verified user account, that require voters to be at least a certain age, that require votes to be submitted from one or more specified locations, and/or that require votes to be submitted within a predetermined time range. If the user and/or query fail to meet specified requirements, voting through the VUI is inhibited. In some examples, the VUI is not displayed with search results. In some examples, the VUI is displayed, but the user is unable to interact with the VUI.

As an example, a fictitious entity underlying TAS, e.g., TAS Productions, can provide rules that require voters to be at least 18 years old, that require votes to be submitted from within the United States, and that require votes to be submitted any time between the start of a live event, e.g., a telecast beginning at 8 PM Eastern US and ending at 10 PM Eastern US on Oct. 31, 2014, and 2 hours after completion of the live event, e.g., 12 AM Eastern US on Nov. 1, 2014. A first user can submit the example query [top american singer] at 9 PM Eastern US on Oct. 31, 2014 from Montreal, Canada, and a user profile associated with the first user can indicate that the user is 25 years old. Based on the example rules, it can be determined that a VUI that enables voting for TAS is not to be displayed in search results in response to the query. A second user can submit the example query [top american singer] at 7 PM Eastern US on Oct. 31, 2014 from Austin, Tex., and a user profile associated with the second user can indicate that the user is 15 years old. Based on the example rules, it can be determined that a VUI that enables voting for TAS is not to be displayed in search results in response to the query. A third user can submit the example query [top american singer] at 10 PM Eastern US on Oct. 31, 2014 from Detroit, Mich., and a user profile associated with the third user can indicate that the user is 19 years old. Based on the example rules, it can be determined that a VUI that enables voting for TAS is to be displayed in search results in response to the query.

In some implementations, it can be determined that a back-end voting system is experiencing technical difficulties, and is unable to process votes. In some examples, it can be determined not to trigger the VUI. In some examples, an appropriate indication can be provided with the search results. For example, an alternative VUI can be displayed, which indicates that voting is currently inhibited. In some examples, the VUI can be displayed, and an indication can be provided that votes, as well as voting results, will be delayed.

In some implementations, a VUI is included by an electronic document that is presented to a user of a computing device, e.g., the user device 106. For example, and as discussed above, the electronic document can include a search results display, such as a search results page displayed in a web browser. In some implementations, the VUI includes one or more user-selectable voting elements that are each associated with an entity, e.g., a contestant, of the campaign. In some examples, the user-selectable voting elements include a radio button, an icon, a widget, a drop down menu, or any other appropriate type of selectable graphical user interface element. In some examples, the user-selectable voting element includes a graphical depiction of the associated entity, e.g., a thumbnail image.

In some implementations, the user-selectable voting elements are presented within the VUI in a predetermined order, e.g., an "order of entities." In some examples, the user-selectable voting elements are presented alphabetically based on names associated with respective entities. In some examples, the user-selectable voting elements are presented in a predetermined order. For example, a producer of the voting-based campaign can define an order, in which entities are to be represented. As another example, the order can be based on a number of votes respective entities have received. In some examples, the user-selectable voting elements are ordered based on previous voting patterns of the user, or a group of users, e.g., users associated with a similar voting pattern.

In some examples, the user-selectable voting elements are presented in a randomized order. In some examples, the order is randomized across users. For example, the user-selectable voting elements are presented in a first random order to a first user, and a second random order to a second user, the first random order being different than the second random order. In some examples, the order of the user-selectable voting elements is consistent each time the VUI is displayed to the user. For example, although the order of the user-selectable voting elements is random the first time that the VUI is displayed to the user, the order can be the same, each time that the VUI is subsequently displayed to the user. That is, for example, the same, or substantially the same order of the user-selectable voting elements is presented to the user each time the VUI is displayed to the user. In this manner, familiarity of the VUI is provided to the user to enable voting accuracy by the user. For example, the user may anticipate a particular user-selectable voting element to be presented at a particular location within the VUI, and thus the user may "automatically," e.g., by habit, select the particular user-selectable voting element based on the particular location.

In some implementations, the campaign that is associated with the VUI is a time-based campaign. In other words, the voting of the entities associated with the campaign occurs over a predefined time period, or time periods. For example, during the predefined time period, the user is able to select one or more of the user-selectable voting elements such that the user is able cast their vote(s). In some examples, the user is able to cast votes concurrently with a corresponding presentation associated with the campaign, e.g., live televised performances by contestants. In this manner, implementations of the present disclosure provide real-time, or substantially real-time voting. Substantial real-time voting may result from communication delays between the live televised performances and the voting.

In some examples, if the VUI is to be displayed to the user at a time that is outside of the predefined time period, e.g., prior to the predefined time period, the user is unable to select the user-selectable voting elements, e.g., the user is unable to vote for entities of the campaign. For example, the voting of the campaign is scheduled to begin at 7 PM Eastern US. However, the user performs a search at 6 PM Eastern US, and it is determined that a VUI could be displayed to the user in response to a search query. Because the search is performed before the campaign is scheduled to being, the user is unable to select the user-selectable voting elements. In some examples, if the VUI is to be displayed to the user at a time that is outside of the predefined time period, the graphical depiction of the VUI can be altered to visually illustrate to the user that selection of the user-selectable voting elements is inhibited. For example, a background color of the VUI can be adjusted, e.g., grayed out. In some examples, a timer is displayed within the VUI, e.g., overlaying the user-selectable voting elements, or presented adjust the user-selectable voting elements, to display a time remaining until the user is able to cast vote(s) using the VUI, e.g., a countdown timer until the campaign is "live."

In some examples, if the VUI is to be displayed to the user at a time that is outside of the predefined time period, an alternative VUI can be displayed. For example, if voting has already occurred, the alternative VUI can display results of the voting. As another example, the alternative VUI can enable the user to indicate support for one or more candidates, without being counted as votes. In this manner, the user can still participate, and indicate support for the candidate in a social network, e.g., to be registered for fan alerts.

In some implementations, the user is associated with an account, e.g., a social networking account, a search service account, for interacting with the campaign through the VUI. In some examples, in order to vote for one or more entities of the campaign, the user is to be logged-in to an account. In this manner, eliminating erroneous or incorrect votes for entities of the campaign can be facilitated. In some examples, when the VUI is presented to the user, and is not currently logged-in to the account, the VUI surfaces a prompt for the user to log-in to the account. In response to the user logging-in to the account, the VUI becomes "active," and the user is able to select one or more of the user-selectable voting elements.

In some implementations, one or more of the user-selectable voting elements is associated with a vote quantity interface element. For example, the user can cast one or more votes for each entity that is represented for voting within the VUI. In some examples, the vote quantity interface element associates a number of votes, e.g., one or more, with the respective entity of the corresponding user-selectable voting element. For example, as provided by voting rules associated with the campaign, the user may provide a number of votes, e.g., one or more votes, for each of the one or more of entities. By adjusting the vote quantity interface element, the user is able to cast a desired number of votes to be associated with a respective entity. In some examples, the vote quantity interface element includes a slider element, a counter element, or any other appropriate interface element that graphically depicts a variable quantity of votes to be selected by the user. In some examples, the vote quantity interface element can further illustrate a number of votes previously associated with each respective entity.

In some implementations, the VUI includes additional information specific to the campaign. For example, the additional information can include social-based information, gaming-based information, and advertisement-based information, described further below.

In some implementations, the VUI is graphically illustrated within the electronic document at a top portion of the electronic document. For example, when the electronic document includes a search results page, the VUI can be displayed above the search results, e.g., as viewed by the user of the electronic document. In this manner, the user visually encounters the VUI prior to other portions of the search results page. In some examples, the VUI is presented adjacent the search results, e.g., to the side of the search results, or displayed within an advertisement, described further below. In some examples, the VUI is displayed within a pop-up window upon initial encounter by the user with the electronic document. For example, upon submitting the search result by the user, a pop-up window is surfaced including the VUI to the user that overlays the electronic document.

In some implementations, the electronic document can include a search results page, a social networking page, or a video-based results page. In some examples, based on user input to the VUI (e.g., a vote), the electronic document can be adjusted. When the electronic document includes a search results page, the search results can be updated based on the voting behavior of the user (or a group of users). For example, the search results can be updated to include results associated with the voted-for entities. For example, a ranking of the search results associated with the voted-for entities can be increased (or decreased) based on the input to the VUI. Similarly, the social networking page or the video-based results page can be adjusted. That is, a stream of posts associated with a social networking page of the user can be adjusted based on the voting behavior of the user (or a group of users). For example, the stream of posts can be updated to include posts associated with the voted-for entities, or a ranking of the posts associated with the voted-for entities can be increased (or decreased) based on the input to the VUI.

Figure 2A:
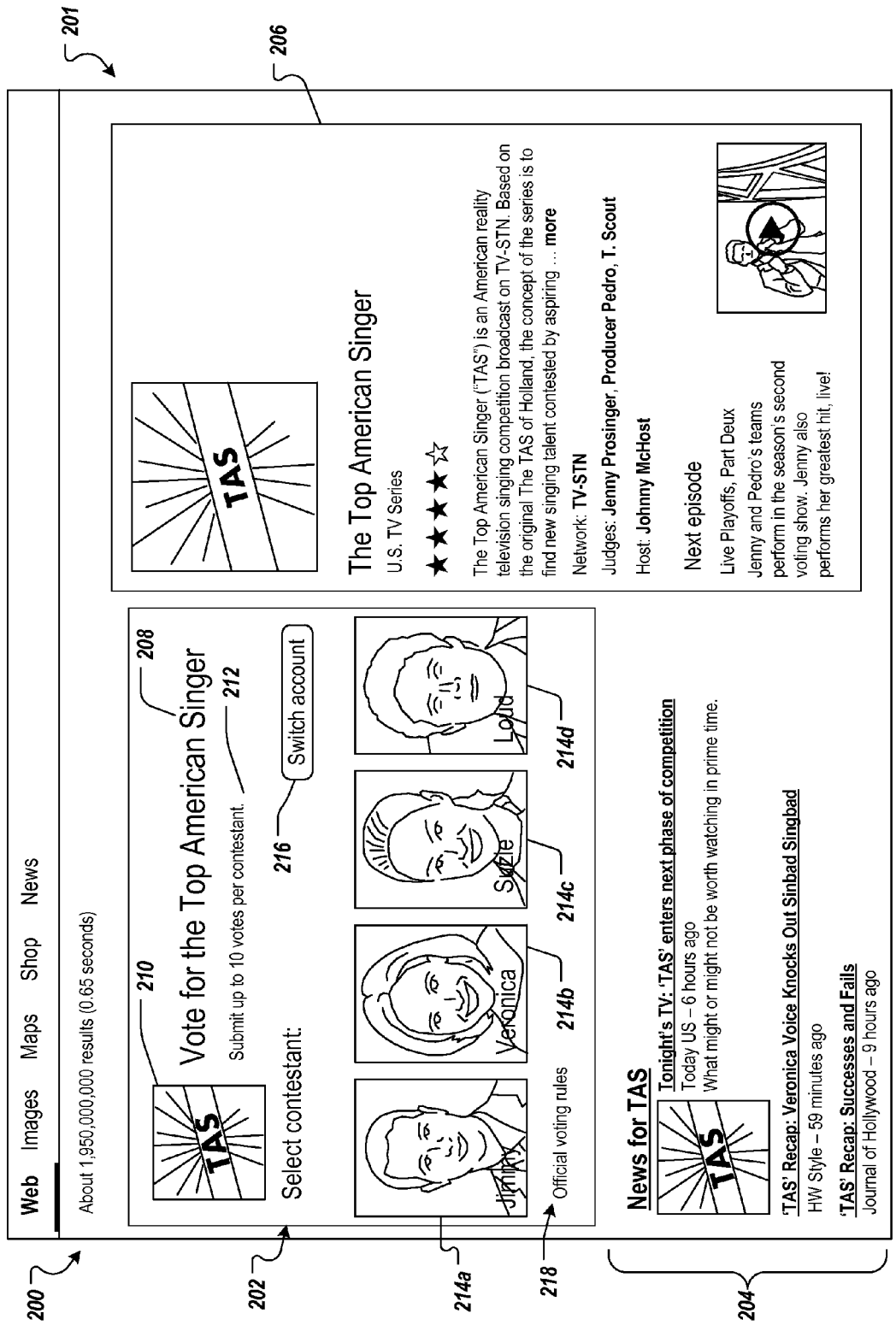

FIGS. 2A-2D depict an example search results display including an example voting user interface (VUI). The examples of FIGS. 2A-2D are provided based on the example context introduced above. FIG. 2A depicts the example search results display as a graphical user interface (GUI) 200, e.g., displayed on the user device 106 of FIG. 1, displaying an electronic document 201. As described herein, the electronic document 201 includes features to support voting of candidates in the fictitious talent contest TAS. In some examples, the electronic document 201 includes a VUI 202, search results 204, and a knowledge panel 206. In some examples, the electronic document 201 is displayed to the user in response to a query. For example, a user can input the example query [top american singer] to a searchbox (not shown). In response to the query, the VUI 202, the search results 204, and the knowledge panel 206 are displayed. In some examples, the search results include general search results that are responsive to the query. Example search results can include news and/or articles about the voting-based campaign, an official website associated with the voting-based campaign, and the like. In the depicted example, the knowledge panel 206 includes content, e.g., text, images, videos, to provide general information regarding the campaign.

In the example of FIGS. 2A-2D, the VUI 202 includes a campaign title 208, a campaign image 210, a campaign sub-title 212, user-selectable voting elements 214a, 214b, 214c, and 214d, collectively referred to as user-selectable voting elements 214, an account button interface element 216, and a link 218. In some examples, the campaign title 208 is text-based and includes a slogan or name associated with the fictitious talent contest TAS. For example, the campaign title 208 includes the slogan "Vote for the Top American Singer." The campaign image 210 can include a picture, illustration, graphic, cartoon, or video that is associated with the fictitious talent contest TAS. For example, the campaign image 210 includes an image commonly associated with the fictitious signing competition TAS. The campaign sub-title 212 can be text-based and/or image-based, and includes related information to the fictitious talent contest TAS. For example, the campaign sub-title 212 provides a voting rule associated with the fictitious talent contest TAS, and specifically includes the text "Submit up to 10 votes per contestant." The user-selectable voting elements 214 are each associated with an entity of the fictitious talent content TAS, e.g., a contestant that is competing in the fictitious talent content TAS. For example, the user-selectable voting element 214a is associated with the fictitious competitor Jimmy Sing-a-lot, the user-selectable voting element 214b is associated with the fictitious competitor Veronica Vocals, the user-selectable voting element 214c is associated with the fictitious competitor Suzie Singer, and the user-selectable voting element 214d is associated with the fictitious competitor Loud Ralph. The account button interface element 216 enables the user to switch accounts, e.g., the logged-in account, to a differing account, e.g., a personal account, a work account, a social network account, a campaign-specific account, to enable voting in the fictitious talent contest TAS. In some examples, when the user is not currently logged-in to an account for voting, the account button interface element 216 can facilitate logging-in, e.g., provide an interface for providing account credentials. The link 218 is associated with an external web page associated with the fictitious talent contest TAS. For example, the link is to "Official voting rules," such that, if the user selects the link 218, the user navigates to another display that displays rules associated with the campaign. However, the link 218 can be associated with any type of link associated with the fictitious talent contest TAS. In some examples, the VUI 202 may be absent of the link 218. In some examples, the VUI 202 can include additional links.

With respect to the voting process, subsequent to surfacing the electronic document 201 to the user, e.g., after providing a search query associated with the fictitious talent contest TAS, the user can vote for one or more of the fictitious competitors. For example, the user can vote for one or more of the fictitious competitors by selecting one or more of the selectable voting elements 214, e.g., by a mouse-controlled cursor, through tactile input to a display of the device.

Figure 2B:
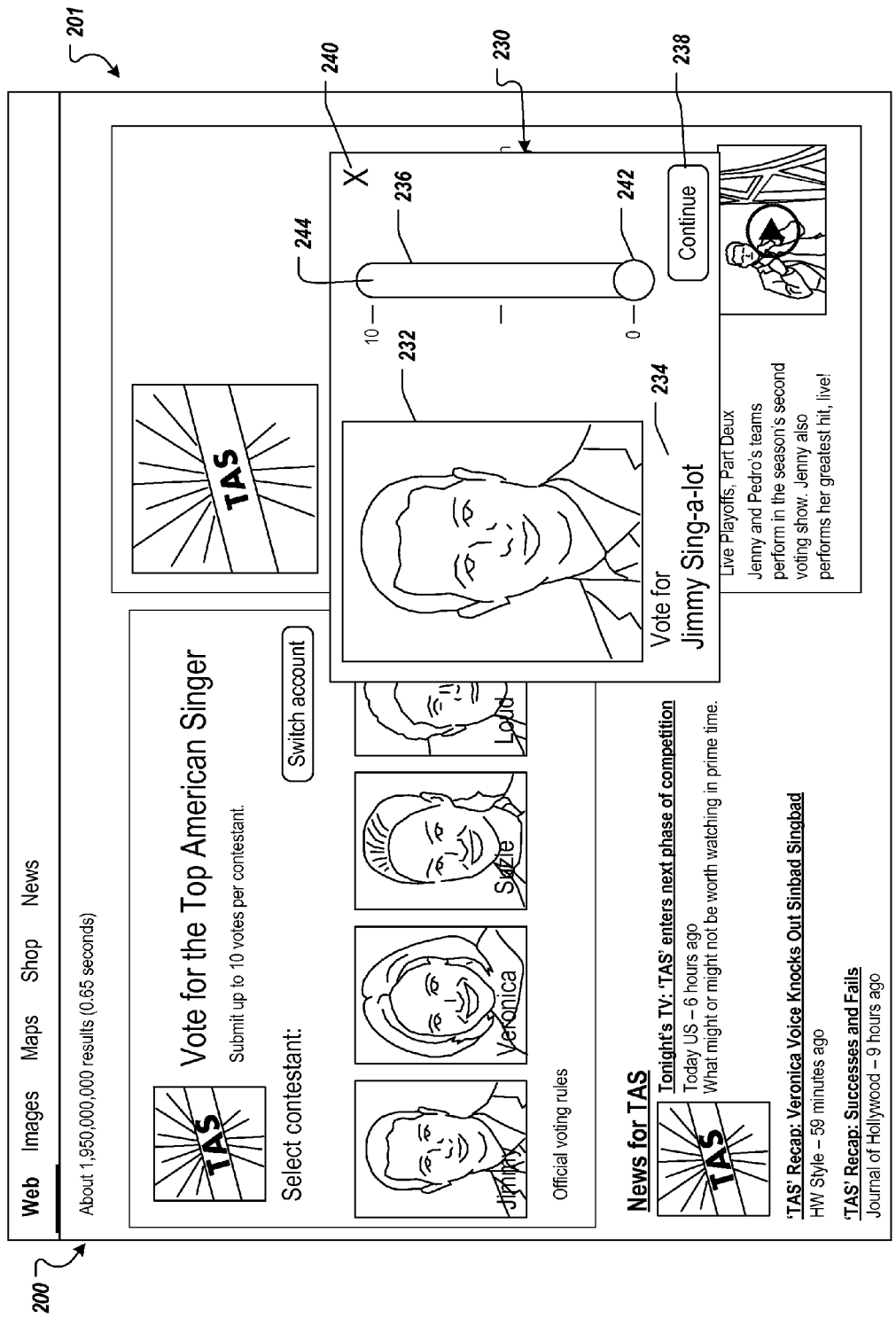

FIG. 2B depicts the GUI 200 including a pop-up voting window 230 overlaying the electronic document 201. In the depicted example, the user selects the fictitious competitor Jimmy Sing-a-Lot by selecting the user-selectable voting element 214a. By selecting the user-selectable voting element 214a, the user has indicated an intent to cast one or more votes for Jimmy Sing-a-Lot. In response to selection of the user-selectable voting element 214a, the pop-up voting window 230 is displayed to the user to progress the voting process. Specifically, the pop-up voting window 230 includes an image 232, text 234, a vote quantity interface element 236, a voting action button interface element 238, and a cancel voting action interface element 240.

Although a pop-up window is described herein, it is appreciated that implementations of the present disclosure can include other appropriate display mechanisms. For example, in response to user selection of a user-selectable voting element 214, a contestant-specific page can be displayed, which provides information regarding a respective contestant and voting functionality, for example.

In the example of FIG. 2B, the image 232 includes a picture, illustration, graphic, cartoon, or video that is associated with the fictitious competitor Jimmy Sing-a-Lot associated with the user-interface selectable voting element 214a. In some examples, the image 232 can be similar to, or the same as the image associated with the interface selectable voting element 214a. The text 234 can include instructions associated with the voting process, e.g., "Vote for," and further include a name of the fictitious competitor represented in the pop-up window 230. The vote quantity interface element 236 is provided as a slider representing a quantity of votes that the user desires to cast for the fictitious competitor Jimmy Sing-a-Lot. For example, the user is able to interact with the vote quantity interface element 236 by "sliding" a button 242 along a path 244 of the vote quantity interface element 236, e.g., by a mouse-controlled cursor, through tactical input by the user. For example, as the button 242 is moved along the path 244 towards the "top" (as viewed by the user), the number of votes the user desires to cast for the fictitious competitor Jimmy Sing-a-Lot increases from zero to ten.

In some examples, the action button interface element 238, when selected, e.g., by a mouse-controlled cursor, through tactical input by the user, progresses the user through the voting process. For example, when the action button interface element 238 is selected, the number of votes indicated in the vote quantity interface element 236 are committed, e.g., vote data can be sent to a backend system. In some examples, and in response to user selection of the action button interface element 236, further content is displayed to the user in the GUI 200, discussed further below. The cancel voting action interface element 240, when selected, e.g., by a mouse-controlled cursor, through tactical input by the user, cancels the voting process and returns to the display of FIG. 2A. For example, when the voting action interface element 240 is selected, the pop-up voting window 230 is closed without any votes being cast, and the GUI 200 is returned to the electronic document 201, e.g., as depicted in FIG. 2A.

Figure 2C:
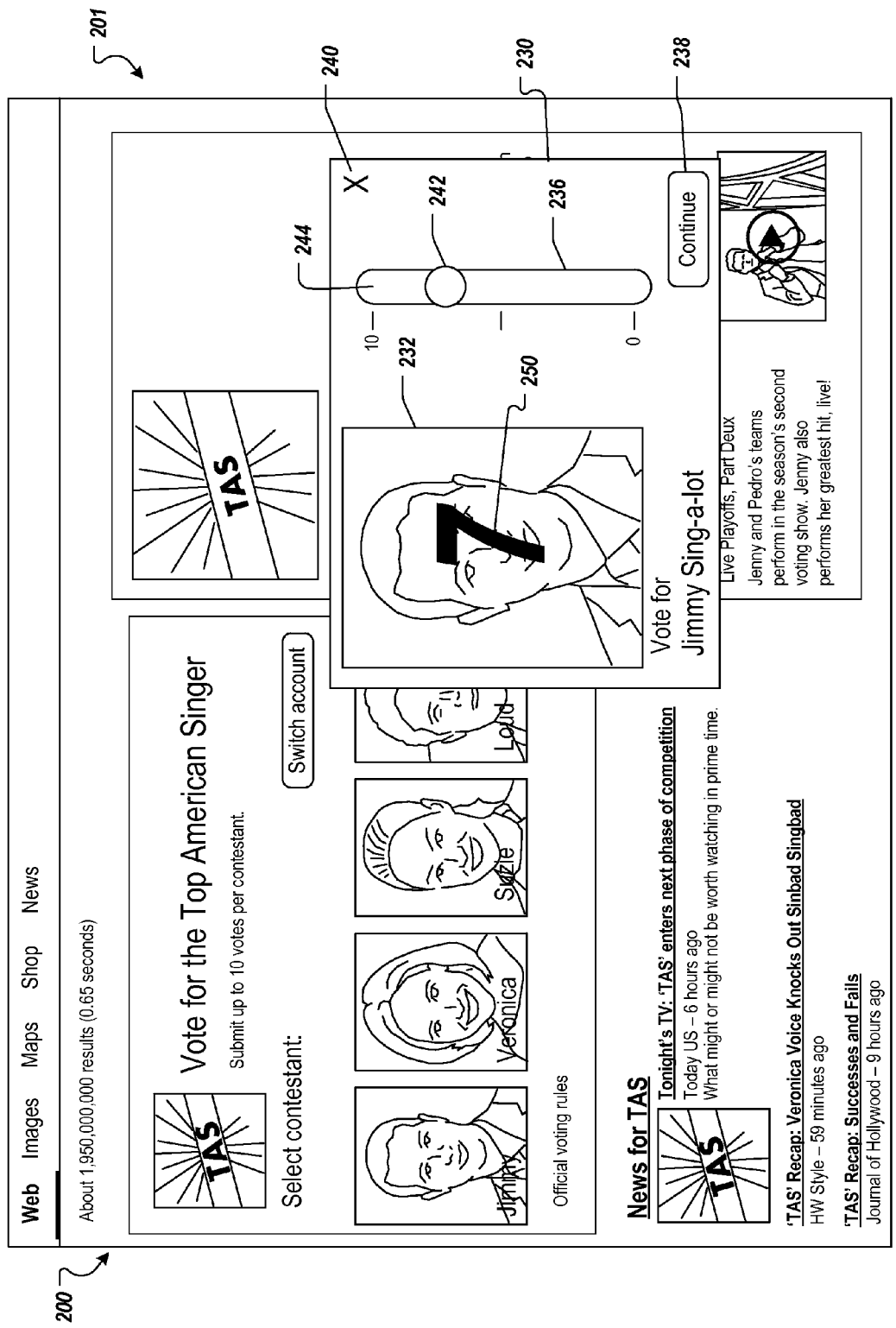

FIG. 2C depicts the GUI 200 including the pop-up voting window 230 in response to user input to the element 236. More particularly, the example of FIG. 2C depicts the pop-up voting window 230 after the user selects a number of votes to cast for the fictitious competitor Jimmy Sing-a-Lot. For example, the user slides the button 242 along the path 244, such that the vote quantity interface element 236 is associated to with, in the depicted example, the number seven to indicate the number of votes that the user intends to cast, e.g., seven votes out of ten votes available for the particular contestant. In some examples, selection of the number of votes results in a vote count overlay 250 to the image 232. The vote count overlay 250 indicates the selected number of votes. In the depicted example, the number seven overlays the image 232. This enables the user to quickly identify the correct number of votes that the user intends to cast for the respective contestant. In some examples, the vote count overlay 250 can be provided in any appropriate portion of the pop-up voting window 230, e.g., adjacent to the vote quantity interface element 236. In some examples, adjusting the number associated with the vote quantity interface element 236 further adjusts the image 232. For example, a background color of the image can change, and/or the image can be greyed-out.

After the user has selected the number of votes that the user intends to cast for the respective contestant, the user can commit the vote(s) by selecting the action button interface element 238. In some examples, the user may want to cancel the voting process before committing the vote(s). Consequently, the user can select the cancel voting action interface element 240.

Figure 2D:
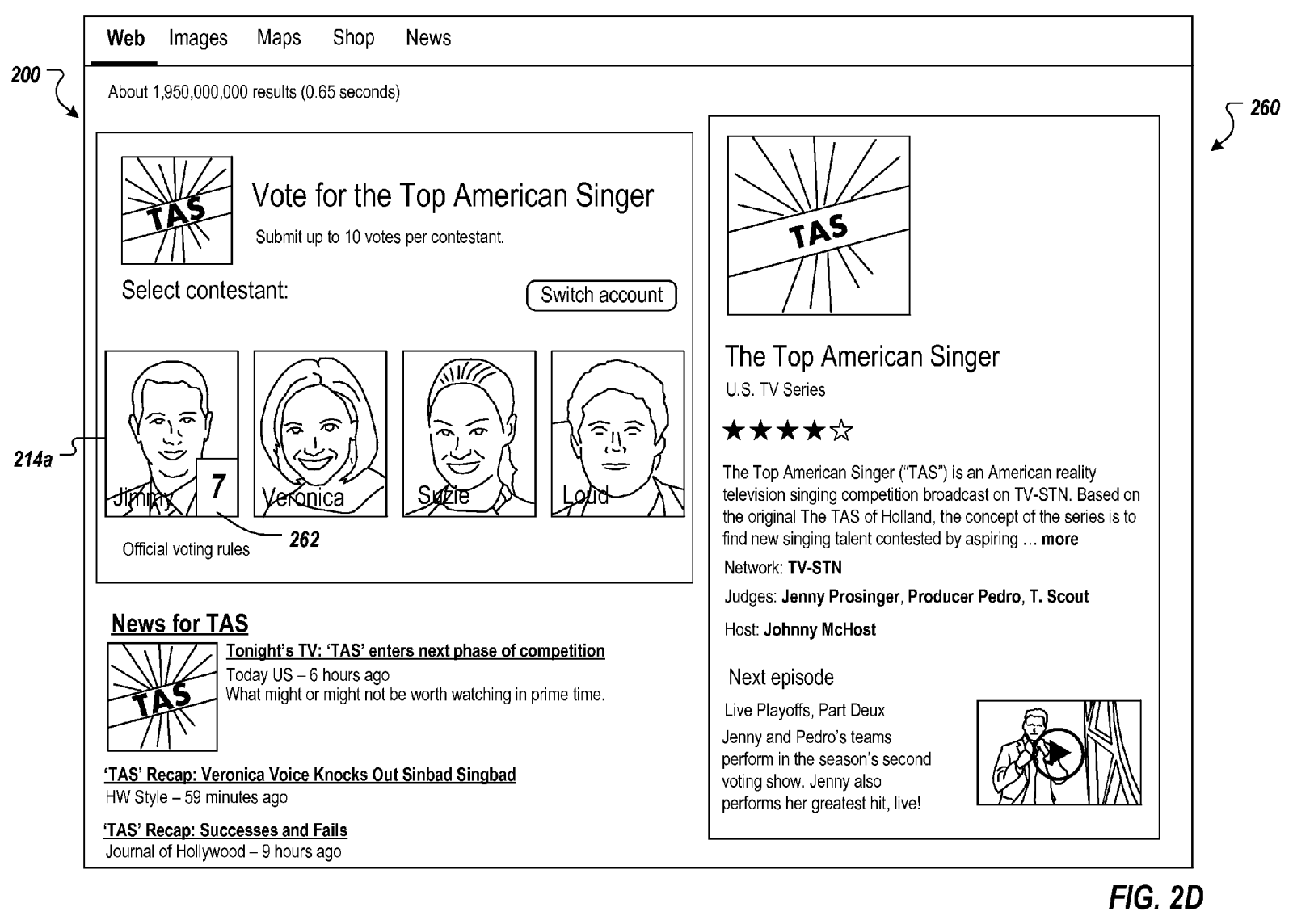

FIG. 2D depicts the GUI 200 including an updated electronic document 260. The updated electronic document 260 is similar to the electronic document 201 and is displayed after the user casts the votes. In the depicted example, the user has cast seven votes for Jimmy Sing-a-Lot, e.g., through the pop-up window 230 of FIG. 2C. In response to voting, the user-selectable voting elements 214 are updated to reflect the numbers of votes casts for the respective contestants. In the depicted example, a vote indicator 262 overlays the user-selectable voting element 214a. In some examples, the VUI 202 can be updated to reflect the results of the fictitious talent contest TAS, e.g., after close of voting for a predetermined time period, e.g., one week, or after completion of the event, e.g., after the fictitious talent contest TAS has ended. In some examples, the VUI 202 is updated to reflect the results in response to a trigger, e.g., a time-based trigger.

In some implementations, the VUI, e.g., the VUI 202, can further include content that is obtained through one or more social media accounts associated with the campaign. For example, as discussed above, the campaign can be associated with one or more entities. In some examples, the entities can further be associated with one or more social media accounts, e.g., a social networking service, a video sharing service, an image sharing service, a micro-blog service. In some examples, entities can include participants in the campaign, e.g., contestants, competitors, judges, coaches, producers. In some examples, entities can include non-participants, e.g., users that monitor the campaign, that watch televised campaign-related events, that vote for campaign contestants. In some examples, content distributed using social media accounts can be determined to be relevant to the campaign, and can be included within the VUI. For example, the VUI can include pictures, e.g., from the image sharing service, micro-blog posts, e.g., from the micro-blogging service, and/or social network posts, e.g., from the social networking service. In some examples, the social media content can further include links or "follow" interface elements associated with the entities of the campaign.

In some examples, the social media content presented within the VUI can include social media that is identified prior to voting for the entities associated with the campaign. For example, the social media content can include "top" or most popular content, e.g., as determined by a ranking engine, of the campaign. In some examples, the social media content presented within the VUI can include social media that is identified after voting for the entities of the campaign. In some examples, the social media content can be based on the entity (or entities) the user casts a vote for. For example, the social media can include pictures, micro-blog posts, social network posts, and/or links to respective social media pages associated with the entity that the user casts a vote for.

In the example context of the fictitious talent contest TAS, the social media content can be obtained from social media accounts associated with the fictitious talent contest TAS, the fictitious competitors, and/or the fictitious judges. For example, the social media content that is selected can include photos that are posted to a social networking service by the fictitious competitors, e.g., "behind the scenes" photos, micro-blog posts by the fictitious judges, e.g., "insider" information, or social media posts by the fictitious talent show TAS, e.g., a teaser trailer for the next episode of TAS.

In some examples, the VUI can further include content that is provided from social media accounts that are specific to the user. For example, the user can be a user of one or more computer-implemented social networking services. Each of the computer-implemented social networking services includes one or more contacts (social networking contacts) that are associated with the user. Social media content associated with the social media contacts of the user can be identified, and further, social media content relating to the campaign can be identified (including social media content relating to the entity that the user cast a vote for). In some examples, the social media content can include a listing of entities that the social networking contacts have voted for, and/or posts the social networking contacts have shared relating to the campaign and/or the voted-for entity.

In some examples, the social media content can include the entities that the social networking contacts of the user voted for. In some examples, based on the voting habits of the user, friend recommendations may be provided to the user. For example, other users of the social media services that have voted for fictitious competitor Jimmy Sing-a-Lot, e.g., over a time period, may be recommended to the user as a potential contact. In some examples, based on the voting habits of the user, the search results, e.g., the search results 204, may be updated. For example, the search results 204 can include results based on the fictitious competitor Jimmy Sing-a-Lot, e.g., a link to a social media account. In some further examples, other related web-based platforms may be updated for which the user is subscribed to based on the voting habits of the user. For example, a video sharing service or a social networking service stream may be updated to include relevant social media related to the fictitious competitor Jimmy Sing-a-Lot. In some examples, based on the voting habits of the user, the user may be registered as a "fan" of the voted entity, and further, receive alters based on such. For example, push notification may be provide to the user, e.g., through the user device 106, for the fictitious competitor Jimmy Sing-a-Lot, e.g., new micro-blog posts.

In some examples, the VUI can include links to share the interaction with the campaign by the user, e.g., over a computer-implemented social networking service. For example, the user is able to endorse the campaign, or after voting for an entity, share the vote on a computer-implemented social networking service that the user is subscribed to.

In some implementations, the VUI, e.g., the VUI 202, can include gaming content. In some examples, the gaming content is provided to engage the user with the campaign, and to increase the user interaction with the campaign. In some examples, the gaming content can include one or more games, or contests, to actively engage the user, e.g., in a competition with one or more social networking contacts of the user. For example, the gaming content can include a prediction game based on predicting winners/losers and/or predicting vote distribution across contestants. In some examples, the user's predictions can be compared with predictions of other users, e.g., the predictions of other users can be displayed to the user. In some examples, the user's predictions can be compared to actual results, e.g., the actual voting results are displayed to the user.

In the example context of the fictitious talent contest TAS, the user predicts that Veronica Vocals is going to obtain 40% of the votes. In contrast, the general population predicts that Veronica Vocals is going to obtain 20% of the votes, and the social networking contacts of the user predict that Veronica Vocals is going to obtain 50% of the votes. In this example, Veronica Vocals actually receives 25% of the votes. Thus, based on the comparison of the prediction between the user and the general population, the general population is identified to be more accurate, e.g., win the "game," and based on the comparison of the prediction between the user and the social networking contacts of the user, the user is identified to be more accurate, e.g., win the "game." In some examples, based on "winning the game," the user can obtain digital-based awards, such as badges, than can be displayed on a social networking account of the user (or other web-based sources).

In some examples, social community building content can be provided based on user interactions with the campaign. For example, a group of users of a computer-implemented social networking service can be determined to have similar interests, e.g., based on voting patterns. A respective group can be created in the computer-implemented social networking service, for example, which group can be suggested to users. For example, a social media group can be created for each contestant of the campaign, where members of the group are able to share content, e.g., texts, videos, images, about a respective contestant. The social media group of a particular contestant can be recommended to users that often vote for the particular contestant. In the example context of the fictitious talent contest TAS, the group of users can be identified as "fans" of the fictitious competitor Jimmy Sing-a-Lot, and thus, are associated with each other through the grouping, e.g., a "fan" group. The grouping can be suggested to the user to join, e.g., after determining the voting pattern of the user.

In some implementations, advertisement content can be provided, which is associated with voting. In some examples, an advertisement can be displayed and can include a VUI. In some examples, an advertisement can be displayed and can include a link to a VUI. In some examples, the advertisement content is associated with a voting-based campaign and/or entities associated with the voting-based campaign. In some examples, the advertisement content can be based on the entity (or entities) that a user voted for. Thus, the advertisement content can be focused, and specific, for each user. In some examples, the advertisement content can include a link to a further voting interface for the user to engage with.

In some implementations, the display of one or more advertisements can be triggered for inclusion with search results. In some examples, triggering of the advertisement can occur based on the search query received from the user. For example, an advertisement can be associated with a list of trigger queries and, if the search query corresponds to at least one trigger query, e.g., is the same as, is a synonym of, the advertisement is triggered. In some examples, an advertisement can be associated with a voting-based campaign, for which a VUI can be displayed in search results. In some examples, if it is determined that the VUI is to be displayed with search results, display of the advertisement can also be triggered. In some examples, an entity underlying the advertisement, e.g., an advertiser, can define circumstances under which the advertisement is to be triggered.

In some examples, the advertisement can be associated with a voting-based campaign, e.g., a contest, that enables users to participate through voting. For example, an advertisement can relate to a product, and can provide a voting contest to vote for a new version of the product. In some examples, the user can vote between multiple versions of the product. Accordingly, the advertisement can be displayed to users as a relatively complex advertisement with an embedded interface, e.g., radiobox, of multiple choices. User selection of a choice from the advertisement will register user votes. In some examples, in response to user selection, information about the product and/or related products can be displayed to the user.

Figure 3:
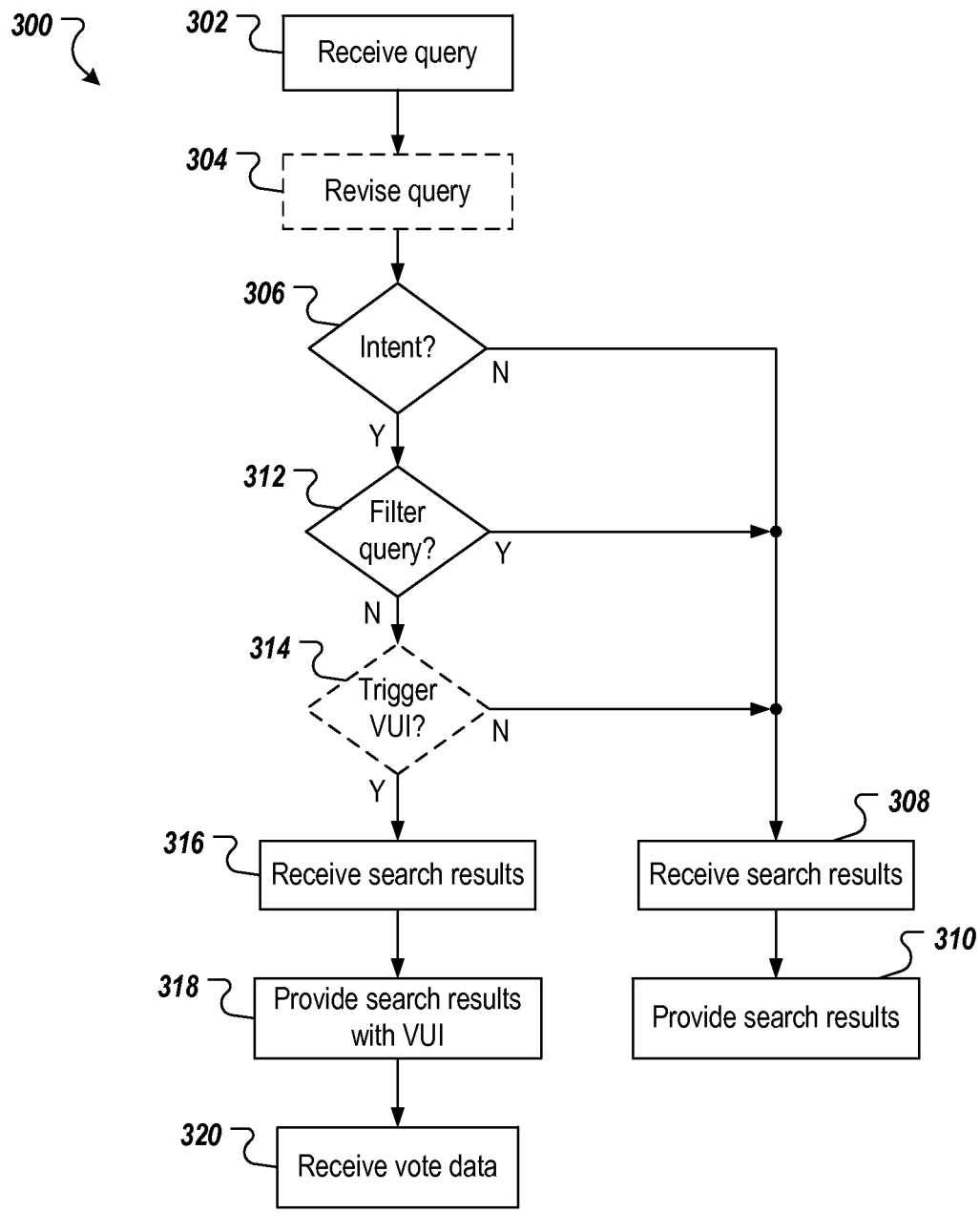
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example environment 100 of FIG. 1. In some examples, the example process 300 can be provided by one or more computer-executable programs executed using one or more computing devices. In some implementations, the example process 300 is performed to support voting in search.

A query is received (302). For example, a user can submit a search query to a search service, e.g., the search service 120 of FIG. 1. The query can be revised (304) (dashed lines indicating optional). For example, the query can be processed to provide a revised query, as discussed in further detail herein. It is determined whether the user has an intent to search for resources associated with an entity that is associated with a voting-based campaign (306). For example, it can be determined that the user has an explicit intent or an implicit intent, as discussed in detail herein. If it is determined that an intent is not present, search results are received (308), and the search results are provided for display to the user (310). For example, the search results, which are responsive to the search query, are provided in a search results display that is displayed to the user.

If it is determined that an intent is present, it is determined whether the query is to be filtered (312). In some examples, and as discussed above, one or more attributes associated with the user and/or the query can be processed to determine whether the user and/or query conforms to requirements of the campaign. If it is determined that the query is to be filtered, search results are received (308), and the search results are provided for display to the user (310). If it is determined that the query is not to be filtered, it can be determined whether a VUI is to be triggered for display with search results (314) (dashed lines indicating optional). For example, and as discussed above, it can be determined that a knowledge panel is to be displayed with search results and, in response, the VUI can be triggered for display with the search results. As another example, and as discussed above, it can be determined that one or more terms of the search query match one or more entities of a knowledge graph, which entities are associated with a voting-based campaign. Consequently, the VUI can be triggered for display. If it is determined that the VUI is not triggered for display, search results are received (308), and the search results are provided for display to the user (310).

If it is determined that the VUI is triggered for display, search results are received (316), and the search results are provided for display to the user with the VUI (318). Vote data is received (318). For example, the user can interact with the VUI to cast one or more votes for one or more entities associated with the campaign, and vote data can be received indicating the cast vote(s).

Figure 4:
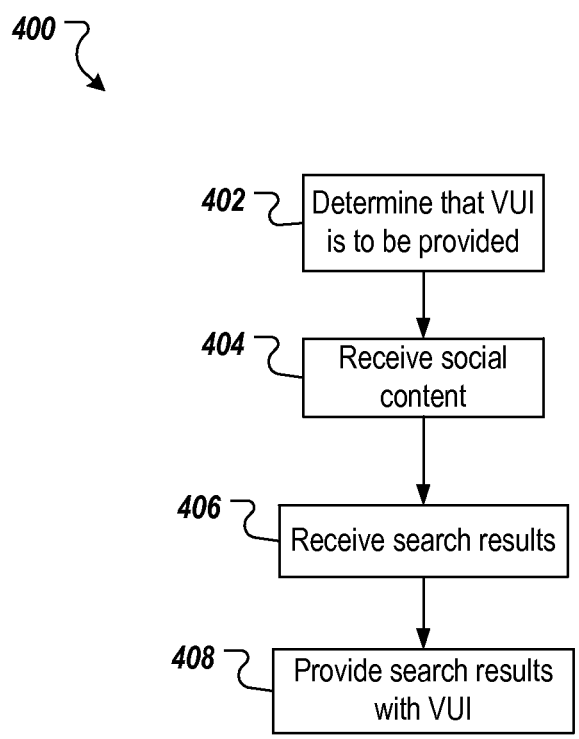
FIG. 4 depicts an example process that can be executed in accordance with implementations of the present disclosure Like reference numbers and designations in the various drawings indicate like elements.

FIG. 4 depicts an example process 400 that can be executed in accordance with implementations of the present disclosure. The example process 400 can be implemented, for example, by the example environment 100 of FIG. 1. In some examples, the example process 400 can be provided by one or more computer-executable programs executed using one or more computing devices. In some implementations, the example process 400 is performed to support voting in search.

It is determined that a voting user interface (VUI) is to be provided with search results (402). For example, an intent of the user can indicate a search for a campaign that utilizes the VUI. In some examples, the VUI enables a user to submit one or more votes in a voting-based campaign. Social content is received, the social content distributed using social networking services (404). For example, content distributed using social media account can be determined to relevant to the voting-based campaign, and can be included within the VUI. Further, for example, the social content can include pictures, e.g., from an image sharing service, micro-blog posts, e.g., from a micro-blogging service, and/or social network posts, e.g., from a social networking service. Search results that are responsive to a search query are received (406), and instructions are transmitted to display the search results and the VUI (408). In some examples, the VUI includes the social content.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed using one or more processors, the method comprising:
   receiving, by the one or more processors, search results that are responsive to a search query provided by a user who has been authenticated;
   determining that the search query is associated with a voting-based campaign;
   identifying a user-specific index of one or more content items, the one or more content items are associated with the user and are available through one or more computer-implemented services;
   cross-referencing the search query with the user-specific index to determine that at least one content item of the one or more content items is associated with the voting-based campaign;
   in response to i) determining that the search query is associated with the voting-based campaign, and ii) that the at least one content item of the one or more content items is associated with the voting-based campaign, providing, by the one or more processors, a voting user interface (VUI) with the search results on a search engine results page, the VUI enabling the user to submit one or more votes in the voting-based campaign through the search engine results page;
   identifying one or more contestants participating in the voting-based campaign;
   receiving user input indicating a vote for a particular contestant of the one or more contestants;
   in response to receiving the user input indicating the vote for the particular contestant:
      i) identifying one or more computer-implemented social networking profiles associated with the particular contestant of the one or more contestants, each computer-implemented social networking profile provided by a respective computer-implemented social networking service,
      ii) identifying one or more social content items associated with the one or more identified computer-implemented social networking profiles, the one or more social content items provided by the particular contestant to the respective computer-implemented social networking service,
      iii) determining, by the one or more processors, that a subset of the one or more social content items is relevant to the voting-based campaign;
   transmitting instructions to display the search results and the VUI, the VUI comprising the subset of the social content items, wherein the social content items are displayed in the VUI in response to the user input indicating the vote for the particular contestant.

2. The method of claim 1, further comprising:
identifying one or more social networking contacts associated with the user through one or more computer-implemented social networking services;
identifying additional social content associated with one or more social networking contacts; and
identifying one or more social content items of the additional social content that are associated with the particular contestant,
wherein the VUI comprises the one or more social content items of the additional social content.

3. The method of claim 1, further comprising, at least partially in response to receiving the user input, prompting the user to participate in a group.

4. The method of claim 3, wherein the group comprises a group that is part of a social networking service, the group being usable to distribute content within the social networking service.

5. The method of claim 1, wherein the VUI further comprises a gaming interface, the gaming interface enabling the user to guess an outcome of voting in the voting-based campaign.

6. The method of claim 1, further comprising:
in response to receiving the user input indicating the vote for the particular contestant, updating the search results to include search results associated with the particular contestant.

7. The method of claim 6, wherein the search results include one or more video-based results.

8. A system comprising:
one or more computers and one or more storage devices storing instructions that are operable, when executed by the one or more computers, to cause the one or more computers to perform operations comprising:
receiving, by the one or more processors, search results that are responsive to a search query provided by a user who has been authenticated;
determining that the search query is associated with a voting-based campaign;
identifying a user-specific index of one or more content items, the one or more content items are associated with the user and are available through one or more computer-implemented services;
cross-referencing the search query with the user-specific index to determine that at least one content item of the one or more content items is associated with the voting-based campaign;
in response to i) determining that the search query is associated with the voting-based campaign, and ii) that the at least one content item of the one or more content items is associated with the voting-based campaign, providing, by the one or more processors, a voting user interface (VUI) is to be provided with the search results on a search engine results page, the VUI enabling the user to submit one or more votes in the voting-based campaign through the search engine results page;
identifying one or more contestants participating in the voting-based campaign;
receiving user input indicating a vote for a particular contestant of the one or more contestants;
in response to receiving the user input indicating the vote for the particular contestant:
  i) identifying one or more computer-implemented social networking profiles associated with the particular contestant of the one or more contestants, each computer-implemented social networking profile provided by a respective computer-implemented social networking service,
  ii) identifying one or more social content items associated with the one or more identified computer-implemented social networking profiles, the one or more social content items provided by the particular contestant to the respective computer-implemented social networking service,
  iii) determining, by the one or more processors, that a subset of the one or more social content items is relevant to the voting-based campaign; and
transmitting instructions to display the search results and the VUI, the VUI comprising the subset of the social content items, wherein the social content items are displayed in the VUI in response to the user input indicating the vote for the particular contestant.

9. The system of claim 8, further comprising:
identifying one or more social networking contacts associated with the user through one or more computer-implemented social networking services;
identifying additional social content further comprises content associated with one or more social networking contacts; and
identifying one or more social content items of the additional social content that are associated with the particular contestant,
wherein the VUI comprises the one or more social content items of the additional social content.

10. A non-transitory computer-readable medium storing software comprising instructions executable by one or more computers which, upon such execution, cause the one or more computers to perform operations comprising:
receiving, by the one or more processors, search results that are responsive to a search query provided by a user who has been authenticated;
determining that the search query is associated with a voting-based campaign;
identifying a user-specific index of one or more content items, the one or more content items are associated with the user and are available through one or more computer-implemented services;
cross-referencing the search query with the user-specific index to determine that at least one content item of the one or more content items is associated with the voting-based campaign;
in response to i) determining that the search query is associated with the voting-based campaign, and ii) that the at least one content item of the one or more content items is associated with the voting-based campaign, providing, by the one or more processors, a voting user interface (VUI) with the search results on a search engine results page, the VUI enabling the user to submit one or more votes in the voting-based campaign through the search engine results page;
identifying one or more contestants participating in the voting-based campaign;
receiving user input indicating a vote for a particular contestant of the one or more contestants;
in response to receiving the user input indicating the vote for the particular contestant:
  i) identifying one or more computer-implemented social networking profiles associated with the particular contestant of the one or more contestants, each computer-implemented social networking profile provided by a respective computer-implemented social networking service,
ii) identifying one or more social content items associated with the one or more identified computer-implemented social networking profiles, the one or more social content items provided by the particular contestant to the respective computer-implemented social networking service,
iii) determining, by the one or more processors, that a subset of the one or more social content items is relevant to the voting-based campaign; and transmitting instructions to display the search results and the VUI, the VUI comprising the subset of the social content items, wherein the social content items are displayed in the VUI in response to the user input indicating the vote for the particular contestant.

* * * * *